United States Patent Office 3,141,501
Patented July 21, 1964

3,141,501
CONTROL OF PERMEABILITY DURING
WATER FLOODING
George G. Bernard and Orrin C. Holbrook, Crystal Lake,
Ill., assignors to The Pure Oil Company, Chicago, Ill.,
a corporation of Ohio
No Drawing. Filed Aug. 26, 1960, Ser. No. 52,036
6 Claims. (Cl. 166—9)

This invention relates to the recovery of petroleum from reservoirs beneath the earth's surface and is more particularly concerned with a flooding method for the recovery of such petroleum in greater amounts than is possible by conventional methods. This invention is especially directed to an improved floodwater composition for flooding clay-containing formations.

This invention is concerned only with those petroleum reservoirs that contain water-sensitive clays. Generally, clays are considered to be detrimental to waterflooding because they tend to swell, disperse, or otherwise respond to the presence of fresh water and render the formation less permeable. It is well known that oil-producing formations containing water-sensitive clays, especially montmorillonites, illites, and kaolinites undergo a marked decrease in injection rates when flooded with fresh or brackish water, that is, water containing up to about 10,000 parts per million total solids. In the presence of such clays in petroleum-bearing formations, it becomes very difficult to maintain adequate injection rates of fresh water necessary for the efficient waterflooding of the reservoir. The lowering of the permeability of clayey reservoirs by the action of fresh water is critical in the region surrounding the water-injection well where the flow from the well develops the greatest resistance.

It has become common practice in the petroleum industry to flood clay-containing oil reservoirs with brine solutions so as to maintain a high permeability. Unfortunately, the presence of salt in floodwater compositions has a detrimental effect in that it reduces the amount of petroleum recoverable from the reservoir as compared with the amount of petroleum that would be recoverable if it were possible to use fresh floodwater.

It is therefore an object of this invention to provide an improved method for secondary recovery of oil from underground reservoirs such that adequate formation permeability to floodwater is maintained and petroleum recovery comparable to that obtainable using fresh water can be had. Other objects of this invention will be apparent from the following description.

We have found that after the floodwater penetrates the formation immediately surrounding the injection bore and radiates out through the producing formation, it will not deleteriously affect the water injection rate, even if its salinity is low.

In accordance with this invention, water-sensitive formations are flooded with fresh water which has been made acidic. The preferred pH range is between about 1 and 3. A fresh water containing such a concentration of hydrogen ions readily flows through the formation immediately surrounding the well bore without causing swelling of the clay, and during such passage the small amount of acidity in the water is neutralized by basic materials contained in the formation, resulting in a floodwater which is essentially neutral. To prevent the floodwater from becoming saline, it is acidified with an acid which when neutralized by the basic constituents of the formation forms an insoluble salt. Thus, the salinity of the floodwater is maintained at a low level.

In the preferred method, fresh floodwater acidified with sulfuric acid to reach the desired pH is used so as to produce a flood having a minimum salinity. As the sulfuric acid is neutralized by basic materials, such as calcium carbonate and calcium oxide in the formation rock, calcium sulfate is precipitated out and the salt content of the floodwater is maintained at a very low level.

Other acids which will react with metals present in the formation to form salts of very low water solubility are suitable for use with this invention. Examples of acids suitable for treating calcium-containing formations are sulfuric acid, oxalic acid, oleic acid, orthophosphoric acid, metaphosphoric acid, stearic acid, and sulfurous acid.

In most cases, it will be desirable to neutralize precipitate-forming materials in the zone of the formation immediately adjacent to the injection well before injecting the sulfuric acid and floodwater. This will prevent the forming of formation-plugging precipitates in the zone of critical injection-pressure loss near the well. This zone may be effectively neutralized with hydrochloric acid, which produces soluble reaction products.

The harmful effects of salt in floodwater upon the recovery of petroleum from clay-containing reservoirs can be illustrated by the results of two tests.

TEST I

A synthetic core containing 2% sodium montmorillonite was initially saturated with Soltrol and then flooded, first with an aqueous 15% solution of sodium chloride to reduce the oil content of the core to residual oil saturation; and then the core was flooded with an aqueous 0.1% sodium chloride solution until the oil content of the core was again reduced to residual oil saturation. In each case the injection flow rate was 4 feet per day, and the inlet pressure was adjusted to maintain this rate.

*Table I—Successive Flooding of Synthetic Core With Brine and Water*

| Floodwater | Percent Oil Recovered | Percent Residual Oil |
|---|---|---|
| 15% NaCl | 58.0 | 42.0 |
| 0.1% NaCl | 72.3 | 27.7 |

It can be seen that by flooding the core with substantially fresh floodwaters, 14.3% more of the Soltrol originally contained in the core was recovered. Soltrol is a mixture of hydrocarbons, essentially all isoparaffinic, made up to represent crude oil by the Phillips Petroleum Company. Soltrol has the following characteristics:

Boiling range _____ 360–400° F.
Specific gravity _____ 0.75–0.76.
Flash point _____ 135–140° F.
Viscosity _____ 100° F., 1.541 centistokes.

A core when flooded with an aqueous solution will produce an amount of oil such that equilibrium is reached in the core. Thereafter, additional quantities of the same injected aqueous material will result in the recovery of no additional oil. In this equilibrium condition the oil saturation of the core is stated to be the residual oil saturation.

In practice, however, it is found that most oil-containing formations also contain amounts of connate water. This connate water generally contains dissolved salts so that it is in essence a brine. In order to determine the effect of fresh floodwaters as compared to salt-containing floodwaters upon the recovery of petroleum from cores containing a mixture of oil and connate brine, Test II was conducted.

TEST II

Water-sensitive berea sandstone cores containing both Soltrol and brine were flooded with brine and then with distilled water.

Each core was flooded with water containing 10% sodium chloride to residual oil saturation, and then was flooded with distilled water to residual oil saturation.

*Table II—Flooding Cores Containing Soltrol and Brine*

| Type Core | Flood-Water | Initial Saturation | | Percent Soltrol Recovered | Residual Soltrol Saturation | Flood Rate, ft./day |
|---|---|---|---|---|---|---|
| | | Percent Soltrol | Brine | | | |
| Berea Sandstone. | 10% NaCl Distilled water. | 75.4 | 24.6 | 19.4<br>31.7 | 60.7<br>51.5 | 0.4<br>0.4 |
| Do | do | 73.7 | 26.3 | 33.8<br>42.2 | 48.8<br>42.5 | 4.0<br>4.0 |
| Do | do | 78.2 | 21.8 | 44.5<br>54.0 | 43.5<br>36.2 | 4.0<br>4.0 |

These data indicate that in water-sensitive clay-containing strata more oil is recovered if fresh floodwater is used, whether or not the formation originally contains saline connate water. As used in this specification and the appending claims, water-sensitive clay-containing formations are those formations containing clays of such kinds and in such amounts that the permeability of the formation to distilled water is less than 50% of the initial permeability of the formation, that is, the permeability to a 10% sodium chloride solution.

As a specific example of the application of this invention, an oil-producing formation containing 2% sodium montmorillonite and 3% calcium carbonate is subjected to a five-spot water drive as follows. First, the calcium carbonate within a radius of 10 feet from the four injection wells is neutralized by injection into each well of a 15% aqueous solution of hydrochloric acid. The amount of acid required is about 170 gallons for each foot of vertical formation depth treated in each of the four wells. Thereafter, the injection of hydrochloric acid is discontinued and floodwater acidified with sulfuric acid to a pH of two is injected. Oil is produced from the fifth well.

The acidified water maintains the permeability of clays near the well bore at a high level, but on passing beyond the neutralized zone, the sulfuric acid reacts with calcium carbonate. This removes the sulfuric acid from the water, and results in a substantially neutral and salt-free floodwater which causes dispersion of the montmorillonite and the resulting improved recovery of oil.

Acids other than the aforenamed which are suitable for use with the process of this invention will be obvious to those skilled in the art. Various kinds and amounts of reagents suitable to the nature of the clay-containing formation to be flooded may be used without departing from the scope and spirit of this invention.

This application is a continuation-in-part of United States application Serial No. 775,710, filed November 24, 1958, now abandoned.

The embodiments of the invention in which an exclusive property or privilege is claimed are defined as follows:

1. In the recovery of oil from underground formations which contain a basic material and a water-sensitive clay by the injection well and into said formation, and the recovery of oil from a producing well, the improvement comprising employing as said floodwater a composition consisting essentially of substantially fresh water acidified to a pH of 1–3 by the addition thereto of an acid capable of reacting with said basic material to form a substantially water-insoluble precipitate.

2. A method according to claim 1 in which said acid is selected from the group consisting of sulfuric acid, oxalic acid, oleic acid, orthophosphoric acid, metaphosphoric acid, stearic acid, and sulfurous acid.

3. A method according to claim 1 in which the basic material is calcium carbonate.

4. A method according to claim 1 in which the injection of said flooding composition is preceded by the injection of a sufficient quantity of acid, capable of forming soluble products on reaction with said basic material, to substantially neutralize the basic material in the zone surrounding the injection well.

5. A process according to claim 4 wherein said zone extends radially from said well a distance of 10 to 20 feet.

6. A process according to claim 5 wherein said fresh water is acidified to a pH of between 1 and 3 by the addition of sulfuric acid.

References Cited in the file of this patent
UNITED STATES PATENTS

| | | |
|---|---|---|
| 2,640,810 | Cardwell et al. | June 2, 1953 |
| 2,839,466 | Shock et al. | June 17, 1958 |
| 2,852,077 | Cocks | Sept. 16, 1958 |

UNITED STATES PATENT OFFICE
CERTIFICATE OF CORRECTION

Patent No. 3,141,501                           July 21, 1964

George G. Bernard et al.

It is hereby certified that error appears in the above numbered patent requiring correction and that the said Letters Patent should read as corrected below.

Column 4, line 14, after "injection" insert -- of flood water through an injection --.

Signed and sealed this 17th day of November 1964.

(SEAL)
Attest:

ERNEST W. SWIDER
Attesting Officer

EDWARD J. BRENNER
Commissioner of Patents